United States Patent
Hammink

(10) Patent No.: US 10,314,321 B2
(45) Date of Patent: Jun. 11, 2019

(54) METHOD FOR OPERATING A BALL MILL AND A MILLING SYSTEM

(71) Applicant: CAOTECH BEHEER B.V., Wormerveer (NL)

(72) Inventor: Jan Hammink, Wormerveer (NL)

(73) Assignee: COATECH BEHEER B.V., Wormerveer (NL)

(*) Notice: Subject to any disclaimer, the term of this patent is extended or adjusted under 35 U.S.C. 154(b) by 100 days.

(21) Appl. No.: 15/208,284

(22) Filed: Jul. 12, 2016

(65) Prior Publication Data
US 2016/0316779 A1    Nov. 3, 2016

Related U.S. Application Data

(63) Continuation of application No. PCT/NL2014/050921, filed on Dec. 30, 2014.

(30) Foreign Application Priority Data

Jan. 15, 2014    (NL) .................................. 2012088

(51) Int. Cl.
*A23G 1/00*    (2006.01)
*A23G 7/00*    (2006.01)
(Continued)

(52) U.S. Cl.
CPC ......... *A23G 1/0026* (2013.01); *A23G 1/0033* (2013.01); *A23G 1/10* (2013.01);
(Continued)

(58) Field of Classification Search
CPC .. A23G 1/0026; A23G 1/0033; A23G 1/0036; A23G 1/10; A23G 1/12;
(Continued)

(56) References Cited

U.S. PATENT DOCUMENTS 3,204,880 A  *  9/1965  Haller ..................... B02C 17/16
                                                    241/29
3,998,938 A  *  12/1976  Szegvari .................. A23G 1/10
                                                    423/594.2

(Continued)

FOREIGN PATENT DOCUMENTS

EP          0442544        8/1991
WO       2015/108412      7/2015

OTHER PUBLICATIONS

Bolenz, et al., "Improving Particle Size Distribution and Flow Properties of Milk Chocolate Produced by Ball Mill and Blending", European Food Research and Technology, vol. 238, Issue 1, 2013, 139-147.

(Continued)

*Primary Examiner* — Drew E Becker
*Assistant Examiner* — Bryan Kim
(74) *Attorney, Agent, or Firm* — Peacock Law P.C.; Janeen Vilven

(57) ABSTRACT

A method for treating a viscous mass comprising solid components in a grinding system, especially a fatty mass with solid components, comprising a mixer and a grinding device, comprising the steps of: feeding into a mixer the mass to be treated; repeatedly circulating the mass to be treated by means of a displacement device from the mixer through a supply pipe to the grinding device and through a return pipe back to the mixer for reducing the size of the solid components in the grinding device; removing from the system at least part of the treated mass through a branch-off provided in the return line when a predetermined grinding fineness has been obtained; and feeding into the mixer a new mass to be treated and at least partly displacing the new mass to be treated in the grinding device via the displacement (Continued)

device and as a consequence removing at least another part of the treated mass from said system.

10 Claims, 1 Drawing Sheet

(51) Int. Cl.
 *B02C 17/10* (2006.01)
 *A23G 1/10* (2006.01)
 *A23L 11/00* (2016.01)
 *A23L 19/00* (2016.01)
 *A23L 25/00* (2016.01)
 *A23L 13/60* (2016.01)
 *A23G 1/12* (2006.01)

(52) U.S. Cl.
 CPC ............... *A23G 7/00* (2013.01); *B02C 17/10* (2013.01); *A23G 1/12* (2013.01); *A23L 11/05* (2016.08); *A23L 13/60* (2016.08); *A23L 19/09* (2016.08); *A23L 25/30* (2016.08)

(58) Field of Classification Search
 CPC .... A23G 1/0003; A23G 1/0006; A23G 1/003; A23P 10/20; A23P 10/224; A22C 17/0026; A23L 11/05; A23L 13/60; A23L 19/01; A23L 19/09; A23L 25/10; A23L 25/30
 USPC .................................... 241/25, 27, 30, 24.26
 See application file for complete search history.

(56) References Cited

U.S. PATENT DOCUMENTS

| | | | | | |
|---|---|---|---|---|---|
| 4,224,354 | A | * | 9/1980 | Szegvari | A23G 1/10 426/518 |
| 2002/0176917 | A1 | * | 11/2002 | Brown | A23G 1/105 426/474 |
| 2004/0071848 | A1 | * | 4/2004 | Gusek | A23G 1/0006 426/430 |
| 2004/0161511 | A1 | * | 8/2004 | Peterson | A23G 1/0016 426/392 |
| 2007/0148318 | A1 | * | 6/2007 | Rubio | A23L 7/198 426/622 |
| 2008/0220146 | A1 | * | 9/2008 | deBoer | A23G 1/0006 426/631 |
| 2013/0196047 | A1 | * | 8/2013 | Zettl | A23G 1/0016 426/631 |
| 2013/0273233 | A1 | * | 10/2013 | Olsen | A23L 1/38 426/633 |
| 2014/0356511 | A1 | * | 12/2014 | England | C12G 3/06 426/592 |
| 2016/0330994 | A1 | * | 11/2016 | Harbs | A23G 1/10 |

OTHER PUBLICATIONS

Ziegler, et al., "Chapter 7: Particle Size Reduction", Industrial Chocolate Manufacture and Use, Wiley-Blackwell, Oxford, UK, 2008, 142-168.

* cited by examiner

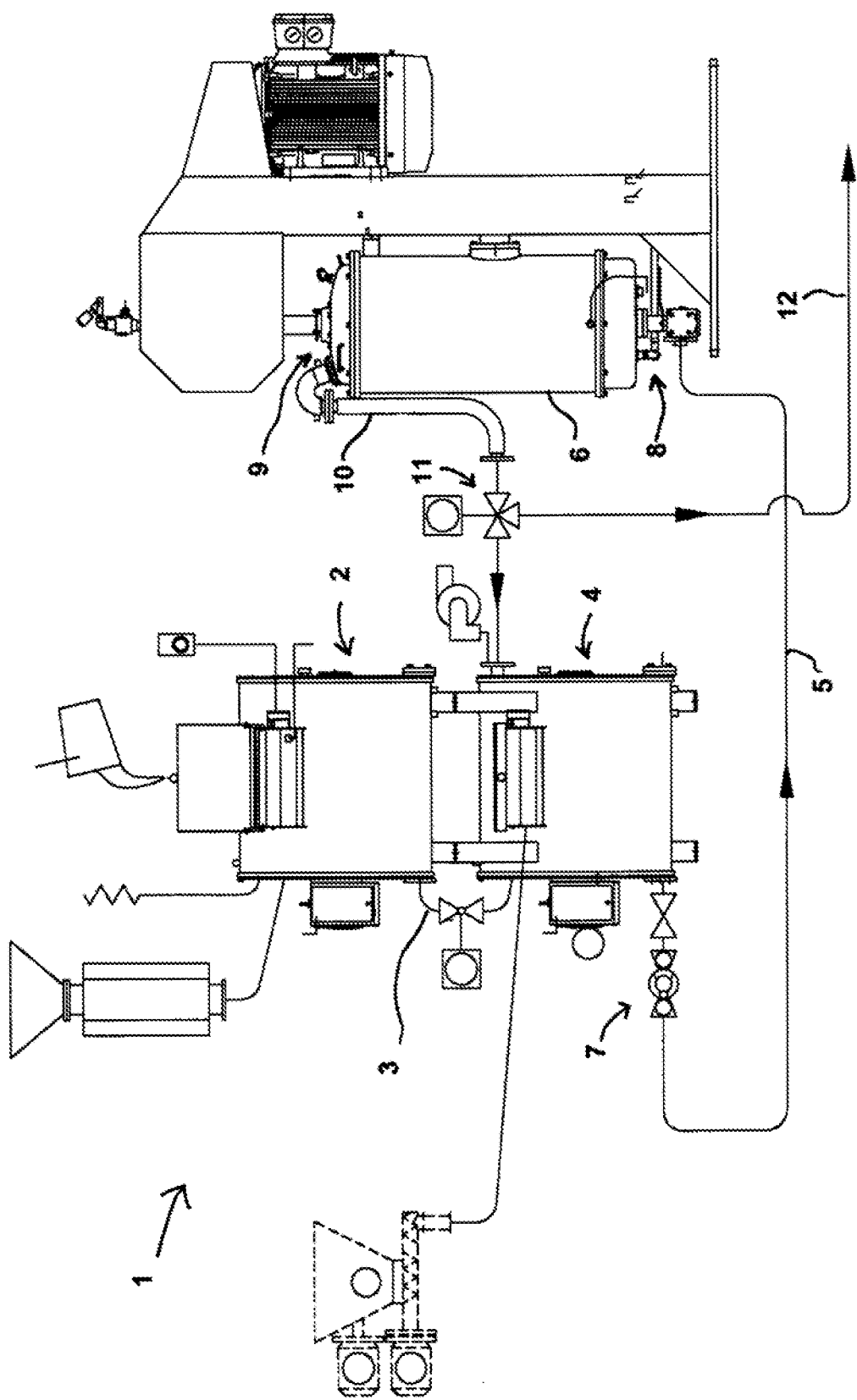

METHOD FOR OPERATING A BALL MILL AND A MILLING SYSTEM

CROSS-REFERENCE TO RELATED APPLICATIONS

This application is a continuation application of Patent Cooperation Treaty Application No. PCT/NL2014/050921, filed on Dec. 30, 2014, which claims priority to Netherlands Patent Application No. 2012088, filed on Jan. 15, 2014, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to a method for treating a viscous mass comprising solid components in a grinding system.

Description of Related Art

Such a method is known in the art. For example, when producing fatty masses that comprise solid components and the like products (such as chocolate and cocoa mass; wherein the fatty mass comprises at least one of the following components: sugar, milk powder, whey powder, lecithin, flavor and cocoa powder), hereinafter generally referred to as "fatty mass", a certain amount of a mass to be ground is fed into a mixer after which the said mass is displaced towards a grinding device by means of a displacement device. Said displacement device usually is a pump. When processing a fatty mass, like chocolate and the like, the pump must be suitable for yielding a relatively large delivery head due to the highly viscous character of the said mass. The mass to be treated is circulated several times, such that the said mass passes through said grinding device several times. As a consequence, the particle size of said solid components is reduced in said grinding device. The grinding device may advantageously be a ball mill, as marketed by the firm Caotech B.V. from Wormerveer/NL, for example the types CAO1000, CAO2000, CAO3000 and CAO4000, all of these being so-called "attrition ball mills". After a required particle size distribution is obtained, said grinding method is ended and the treated mass is removed from said system. Such is obtained by removing said treated mass through a branch off that is provided in the supply pipe by using said pump. The branch of usually is provided somewhere before or after said ball mill; for example, as a branch off in a pipe between the pump and the ball mill, or as a branch off in a pipe between the ball mill and the mixer. However, part of said treated mass that is present in said grinding device will substantially not be removed from the system, since a main part thereof will stick to the grinding facilities. Such especially is obtained when using ball mills. The amount of treated mass remaining in the system may be up to 40% of the total amount of treated mass in said system.

A disadvantage of said known method therefore is comprised of the fact that a large amount of treated mass remains in the system.

In the art, there is no practical or economical solution for a ball mill, as far as it regards coca, chocolate and chocolate-like products. The so-called 5-roll refiner that is used for processing chocolate and chocolate-like products is no economic match for a ball mill.

BRIEF SUMMARY OF THE INVENTION

The present invention relates to a method for treating a viscous mass comprising solid components in a grinding system, especially a fatty mass with solid components, said grinding system comprising a mixer and a grinding device, said method comprising the steps of: feeding into a mixer the mass to be treated; repeatedly circulating the mass to be treated by means of a displacement device from the mixer through a supply pipe to the grinding device and through a return pipe back to the mixer for reducing the size of said solid components in said grinding device; and further comprising the step of: removing from the system at least part of the treated mass through a branch-off provided in the return line when a predetermined grinding fineness has been obtained; and feeding into the mixer a new mass to be treated and at least partly displacing the new mass to be treated in said grinding device by means of said displacement device and as a consequence removing at least another part of said treated mass from said system.

The present invention aims at providing an improved method of the kind indicated in the preamble.

The invention especially aims at providing a method of the kind mentioned in the preamble that yields a larger output than the systems presently available.

The invention also aims at providing an improved method with which an improved product is obtained.

Further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawing, which is incorporated into and forms a part of the specification, illustrates one or more embodiments of the present invention and, together with the description, serves to explain the principles of the invention. The drawing is only for the purpose of illustrating one or more preferred embodiments of the invention and are not to be construed as limiting the invention. In the drawings:

FIG. 1 is a diagram illustrating the method and system of the invention.

DETAILED DESCRIPTION OF THE INVENTION

So as to obtain at least one of the above mentioned advantages, according to a first embodiment the present invention provides a method comprising the features of claim 1. Such method has the advantage that a faster production and a larger output for every batch are obtained.

It has also shown that in the method according to the present invention a considerably smaller particle size distribution is obtained than with the methods according to the state of the art. This may be due to the act that in the known method the subsequent batch is mixed with a large amount of the previous batch and is subjected to the grinding processed again. As a consequence, part of said mass is ground too fine. Such yields a still higher viscosity, especially when grinding fatty masses. In its turn, a higher viscosity leads to a larger amount that remains in said grinding device due to its sticky behavior, especially in a ball mill. Therefore, the present invention provides a huge advantage with respect to the method according to the state of the art because the particle size distribution is much smaller. Such synergetic result was completely unexpected.

It has also shown that temperature control is much better with the present novel method. The temperature of the mass to be treated increases when processing same. With the known method, the starting temperature is larger than with the present method, due to the large amount of treated mass remaining in the system. The lower starting temperature in the present method provides a lower end temperature of the treated mass, even if the mass is cooled interim. This synergetic effect is completely unexpected as well.

As mentioned above, it is especially preferred for the grinding device to be a ball mill. This allows one to obtain an accurate grinding, while obtaining a relatively accurate displacement of the mass to be treated within said grinding system as well, yielding an accurate grinding of said mass.

As mentioned above, it is preferred that the viscous fatty mass is a fatty mass that comprises solid components that comprises at least one of the following components: sugar, milk powder, whey powder, lecithin, flavor and cocoa powder as solid components. An example thereof is a mass comprising cocoa butter. The fatty mass may for example be mixed with sugar, milk powder and flavors and be ground in said grinding device until a required particle size distribution is obtained. Regarding production of chocolate or chocolate like products, cocoa mass or cocoa powder, respectively, may be added. Other substances may be added as desired to the recipe.

Preference is especially given to a method wherein the volume of the new mass to be treated is larger than the mixer's volume. This renders it possible that when replacing the treated mass with a new mass to be treated, the mixer and a further part of the grinding system is filled with the new mass to be treated. This is contradictory to the state of the art, where only the mixer can be filled with the new mass to be treated.

Therefore, it is preferred that the system comprises a storage vessel, the volume of which is larger than the mixer's volume. In said storage vessel, a stock of mass to be treated may be composed that can be fed into said mixer when a treated mass is to be removed from the system.

It is especially preferred that the volume of the new mass to be treated is smaller than the combined volume of the mixer and the grinding device. Due to the mixer's volume, the amount of new mass to be treated will be added incrementally to said mixer. When removing the treated mass from the system, no ideal plug flow behavior will be obtained in the grinding device. As a consequence, part of the new mass to be treated will reach at the branch off in said return pipe whereas a small part of said treated mass still remains in the system. Although according to the present invention a small part only remains in the system, such amount is very small, maximally 10% and preferably even less than 5%.

According to a further aspect, the invention relates to a grinding system for performing a method according to the present invention as mentioned above, said grinding system comprising a mixer and a grinding device, said mixer on the one hand being connected to the grinding device by means of a supply pipe and a displacement device being provided for displacing said mass from said mixer to the grinding device, and on the other hand said grinding device being connected to said mixer by means of a return pipe, said grinding system being characterized in that a branch off is provided in said return pipe for removing treated mass from said system. In such system, the several embodiments of the method according to the invention can easily be implemented, such that the advantages as stated above are accomplished.

In the system according to the present invention, it is especially preferred that the storage vessel has a larger volume than the mixer.

It is especially preferred that the grinding device comprises a ball mill, with the remark that the grinding system is not limited to such ball mill.

So as to be able to displace the mass through said system, it is preferred that the displacement device comprises a pump.

The invention also relates to a treated mass, obtained with the method according to the present invention or with a grinding system according to the invention. The particle size distribution of such mass is substantially smaller than the particle size distribution of a mass according to the state of the art.

The invention also relates to a fatty mass that comprises ground solid components, obtained with a method according to the present invention or with a grinding system according to the invention. The particle size distribution of such mass is considerably smaller than the particle size distribution of a mass obtained according to the state of the art.

Hereafter, the invention will be further described by means of a drawing. The drawing shows in FIG. 1 a schematic view of a grinding system according to the present invention.

For sake of simplicity, not all parts that are required for a practical embodiment of the invention are shown in the drawing.

FIG. 1 shows a schematic view of a grinding system 1 according to the invention. Said grinding system 1 comprises a storage vessel 2, being connected to a mixer 4 through a connection pipe 3. Said mixer 4 is connected to a ball mill 6 through a supply pipe 5. A mass to be treated (not visible) is fed through the supply pipe 5 to the bottom 8 of said ball mill 6 by means of a pump 7 from said mixer 4. In the embodiment shown in the FIGURE, said mass to be treated runs through said ball mill 6 from the bottom up. At the top 9 of said ball mill 6 the treated mass leaves said ball mill 6 and is returned through a return pipe 10 to the mixer 4. In said mixer, the treated mass is mixed with other content. Subsequently, said mass is fed from said mixer 4 to the ball mill 6 again through supply pipe 5. This treatment is performed for a predetermined time period or as long as necessary until a required particle size distribution of the particles that are present in the mast to be treated is obtained.

Upon finishing the treatment, pump 7 displaces treated mass from mixer 4 through ball mill 6 and removes same at branch off 11 through drain pipe 12. After said mixer is emptied, a new mass to be treated is fed from storage vessel 2 into said mixer 4 and, in synchronism with pumping of said treated mass, pumped into ball mill 6 through supply pipe 5. The amount of new mass to be treated that is added to the mixer 4 is such, that no new, unground mass to be treated reaches drain pipe 12. Right before that moment, branch off 11 is closed and the grinding process according to the present invention is continued. Due to the fact that the volume of the mixer is smaller than the volume of new mass to be treated that was added, the new mass to be treated cannot be added in one step to the mixer. As a consequence, after closing branch off 11 the remaining part of the new mass to be treated can be fed into said mixer and the treatment cycle can be performed on said new mass to be treated.

The method according to the present invention is extremely suitable for grinding fatty masses, such as mentioned before. A practical application of a fatty mass according to the present invention for example consists of production of chocolate products for stuffing and the like.

The invention is not limited to the embodiments as mentioned above and as shown in the drawing. The invention is limited only by the appending claims.

The invention also embodies al combinations of features and steps that have been described herein independently from each other.

What is claimed is:

1. A method for treating a viscous fatty mass that comprises solid components in a grinding system, said grinding system comprising a mixer and a grinding device, the method comprising the steps of:
    feeding into the mixer the mass to be treated,
    repeatedly circulating the mass to be treated by means of a displacement device from the mixer through a supply pipe to the grinding device and through a return pipe back to the mixer for reducing the size of said solid components in said grinding device,
    removing from the system at least part of the treated mass through a branch-off provided in the return pipe when a predetermined grinding fineness has been obtained, and
    feeding into the mixer a new mass to be treated and at least partly displacing the new mass to be treated in said grinding device by means of said displacement device and as a consequence removing at least another part of said treated mass from said system.

2. The method according to claim 1, wherein said grinding device is a ball mill.

3. The method according to claim 1, wherein said fatty mass is a mass comprising at least one of the following components: cocoa mass, milk powder, whey powder, lecithin, flavor, and sugar.

4. The method according to claim 1, wherein a volume of the new mass to be treated is larger than the mixer's volume.

5. The method according to claim 4, wherein the volume of the new mass to be treated is smaller than the combined volume of the mixer and the grinding device.

6. The method according to claim 1, wherein the system comprises a storage vessel the volume of which is larger than the mixer's volume.

7. A grinding system for performing a method according to claim 1, wherein the grinding system comprises the mixer and the grinding device, said mixer being connected to the grinding device by means of the supply pipe and the displacement device being provided for displacing said mass from said mixer to the grinding device, and said grinding device being connected to said mixer by means of the return pipe, wherein the branch off is provided in said return pipe for removing treated mass from said system.

8. The grinding system according to claim 7, said grinding device comprising a ball mill.

9. The grinding system according to claim 7, said displacement device comprising a pump.

10. The grinding system according to claim 7, comprising a storage vessel, the volume of said storage vessel being larger than the mixer's volume.

* * * * *